(12) United States Patent
Kim et al.

(10) Patent No.: US 9,331,985 B2
(45) Date of Patent: May 3, 2016

(54) PORTABLE DEVICE, A STATIONARY DEVICE, A DIGITAL DEVICE AND A METHOD FOR PERFORMING SECURE COMMUNICATION USING THEREOF

(71) Applicant: INTELLECTUAL DISCOVERY CO., LTD., Seoul (KR)

(72) Inventors: Seungil Kim, Seoul (KR); Youngil Ko, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 14/259,698

(22) Filed: Apr. 23, 2014

(65) Prior Publication Data
US 2014/0325222 A1    Oct. 30, 2014

(30) Foreign Application Priority Data

Apr. 24, 2013  (KR) .................. 10-2013-0045186
Apr. 24, 2013  (KR) .................. 10-2013-0045195

(51) Int. Cl.
*H04L 9/32* (2006.01)
*H04L 29/06* (2006.01)
*H04W 12/04* (2009.01)

(52) U.S. Cl.
CPC .......... *H04L 63/0428* (2013.01); *H04L 63/061* (2013.01); *H04W 12/04* (2013.01)

(58) Field of Classification Search
None
See application file for complete search history.

(56) References Cited

U.S. PATENT DOCUMENTS

| | | | |
|---|---|---|---|
| 8,027,510 B2 * | 9/2011 | Rhoads .................... | 382/100 |
| 2004/0128512 A1 * | 7/2004 | Sharma et al. .............. | 713/176 |
| 2010/0322485 A1 * | 12/2010 | Riddiford .................. | 382/115 |

* cited by examiner

*Primary Examiner* — Brandon Hoffman

(57) ABSTRACT

A method includes sensing an image of a portable device by using a camera unit, acquiring an orientation information estimation value of the portable device by using the sensed image, extracting key generation information for secure communication by using the orientation information estimation value, generating a secret key by using the extracted key generation information, and performing secure communication with the portable device by using the secret key.

26 Claims, 13 Drawing Sheets

PORTABLE DEVICE, A STATIONARY DEVICE, A DIGITAL DEVICE AND A METHOD FOR PERFORMING SECURE COMMUNICATION USING THEREOF

RELATED APPLICATIONS

This application claims the benefit of Korean Patent Application No. 10-2013-0045186, filed on Apr. 24, 2013 and Korean Patent Application No. 10-2013-0045195, filed on Apr. 24, 2013, which are hereby incorporated by references as if fully set forth herein.

FIELD OF THE INVENTION

The present invention relates to a portable device, a stationary device, a digital device, and a method for performing secure communication using the same, and particularly, to a method for generating a secret key for secure communication between a portable device and a stationary device and performing secure communication among the portable device, the stationary device, and a digital device by using the generated secret key.

BACKGROUND OF THE INVENTION

In an ad-hoc network environment in which various devices are connected to one another for use, pairing among the devices is a necessary factor. The ad-hoc network needs no base network device generally required for communication among devices constituting a network. That is, the ad-hoc network needs no a repeater among the devices constituting the network, such as a router or an AP (Access Point). The ad-hoc network can be established when a partial connection between devices constituting this network is performed, that is, pairing between a current specific device and another device is performed.

Recently, portable devices have been extensively used and communication using such portable devices has been increased more and more. Accordingly, the importance of an ad-hoc network, which enables communication among devices regardless of time and place even in an environment having no base network device for communication among devices, has been increased more and more. Data transmission between smart phones, screen coupling between a smart phone and a tablet or a smart TV, and the like may be an example of such an ad-hoc network.

In the ad-hoc network environment, since there is no base network device, the generation and management of a secret key to be used for communication security among devices are an important problem to be solved. In the ad-hoc network environment, since it is general that there is no trusted authority for distributing a secret key, a method for sharing the secret key among devices is very limited. Meanwhile, a RSA (Rivest Shamir Adleman) scheme, which is one of public key encryption schemes, has been extensively used for secure communication among devices. This algorithm uses two large decimals (normally, numbers of 140 digits or more), and one public key and the other one individual key are generated through a multiplication and an addition operation of these numbers. By using the generated public key and individual key, it is possible to encrypt and decrypt data that is used for communication.

However, the aforementioned RSA scheme is disadvantageous in that a calculation amount is large. In general, in order to generate a public key and an individual key in a Pentium-level computer, about 20 seconds to several minutes are required. Furthermore, the RSA scheme requires a large calculation amount for decryption. In addition, portable devices mainly used in the ad-hoc network are difficult to ensure a high computing capability due to problems of a battery, portability, and heat generation and the like. Therefore, the RSA scheme requiring a large calculation amount is not sufficient as a secure solution for the ad-hoc network.

SUMMARY OF THE INVENTION

In view of the above, the present invention has an object for efficiently generating a secret key for secure communication among devices in a network environment.

The present invention has an object for allowing devices for performing secure communication to safely share a secret key.

In accordance with an embodiment of the present invention, it is possible to generate a secret key for secure communication among devices with a small operation amount and to share the secret key.

In accordance with an embodiment of the present invention, when a secret key is shared among devices, since a separate communication channel is not used, it is possible to escape from risk such as hacking.

In accordance with an embodiment of the present invention, even when a sensor unit for detecting orientation information is provided only to one device, it is possible to generate a secret key and perform secure communication by using the secret key.

The present invention proposes a method for efficiently sharing a secret key in secure communication, particularly, secure communication employing a symmetric key encryption scheme.

In accordance with an aspect of the exemplary embodiment of the present invention, there is provided a method for performing secure communication using a stationary device, which includes sensing an image of a portable device by using a camera unit, acquiring an orientation information estimation value of the portable device by using the sensed image, extracting key generation information for secure communication by using the orientation information estimation value, generating a secret key by using the extracted key generation information, and performing secure communication with the portable device by using the secret key.

In the exemplary embodiment, the orientation information estimation value may include angular information of the portable device for at least one of an x axis, a y axis, and a z axis.

In the exemplary embodiment, the orientation information estimation value may include the angular information detected at a preset time interval for a preset time.

In the exemplary embodiment, in the step of extracting the key generation information, the orientation information estimation value may be converted to a value of a preset quantization step.

In the exemplary embodiment, further may include receiving orientation information detected by the portable device, and calculating a compensation function by using the orientation information estimation value and the received orientation information, wherein the key generation information is extracted using the orientation information estimation value and the compensation function.

In the exemplary embodiment, the step of performing the secure communication may include encrypting data by the generated secret key, and transmitting the encrypted data to the portable device.

In the exemplary embodiment, the step of performing the secure communication may include receiving data from the portable device, and decrypting the received data by the secret key.

In accordance with an another aspect of the exemplary embodiment of the present invention, there is provided a stationary device, which includes a processor that controls an operation of the stationary device, a camera unit that senses an image and transfers the sensed image to the processor, and a communication unit that transmits/receives data based on a command of the processor, wherein the processor senses an image of a portable device by using the camera unit, acquires an orientation information estimation value of the portable device by using the sensed image, extracts key generation information for secure communication by using the orientation information estimation value, generates a secret key by using the extracted key generation information, and performs secure communication with the portable device by using the secret key.

In accordance with an further another aspect of the exemplary embodiment of the present invention, there is provided a method for performing secure communication using a digital device, which includes outputting a first light pattern by using a radiator of a proximity sensor, acquiring a second light pattern received by a receiver of the proximity sensor, extracting key generation information for secure communication by using the acquired second light pattern, generating a secret key by using the key generation information, and performing secure communication with an external device by using the generated secret key.

In the exemplary embodiment, in the step of extracting the key generation information, when the second light pattern is equal to the first light pattern, the key generation information may be extracted using the second light pattern.

In the exemplary embodiment, in the step of outputting the first light pattern, when the second light pattern is not acquired for a preset time, output of the first light pattern may be stopped.

In the exemplary embodiment, further may include detecting orientation information of the digital device, wherein, in the step of outputting the first light pattern, when orientation of the digital device is preset orientation, the first light pattern may be output.

In the exemplary embodiment, the step of performing the secure communication may include encrypting data by the secret key, and transmitting the encrypted data to the external device.

In the exemplary embodiment, the step of performing the secure communication may include receiving data from the external device, and decrypting the received data by the secret key.

In accordance with an further another aspect of the exemplary embodiment of the present invention, there is provided a digital device, which includes a processor that controls an operation of the digital device, a proximity sensor that includes a radiator that outputs a light pattern and a receiver that receives a light pattern, and a communication unit that transmits/receives data based on a command of the processor, wherein the digital device outputs a first light pattern by using the radiator of the proximity sensor, acquires a second light pattern received by the receiver of the proximity sensor, extracts key generation information for secure communication by using the acquired second light pattern, generates a secret key by using the key generation information, and performs secure communication with an external device by using the generated secret key.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings.

[First Embodiment]

Figure 1:
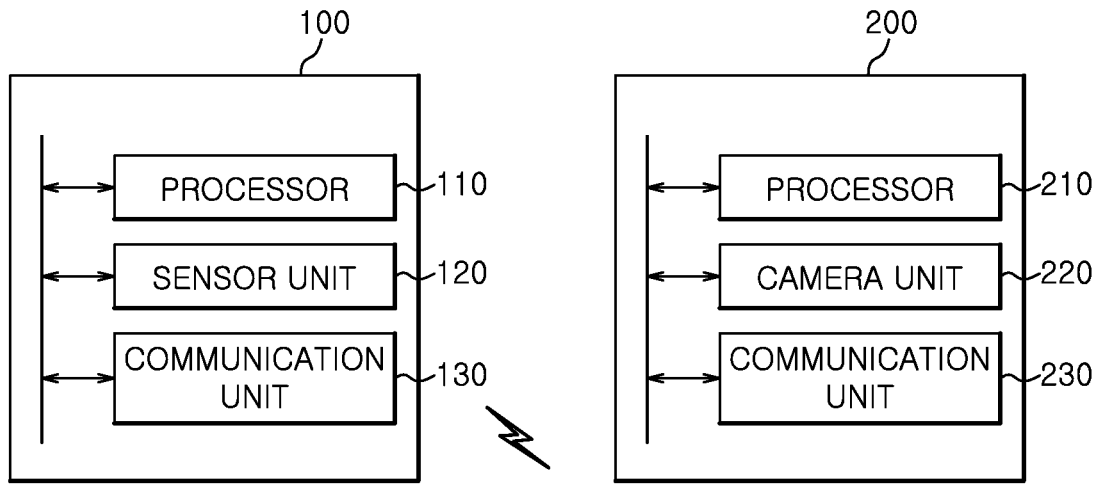
FIG. 1 is a block diagram illustrating a portable device and a stationary device in accordance with a first embodiment of the present invention.

FIG. 1 is a block diagram illustrating a portable device 100 and a stationary device 200 in accordance with a first embodiment of the present invention.

In the present embodiment, the portable device 100 is a device portable by a user for use, and includes various types of digital devices such as a smart phone, a PDA (Personal Digital Assistant), a tablet PC, a remote controller, or a music player. The stationary device 200 is a device generally fixed at a specific place for use, and includes various types of non-portable devices such as a television, a digital signage, a wall display, an ATM (Automatic Teller's Machine), an electric board, or a billboard. However, the present invention is not limited thereto, and the portable device 100 and the stationary device 200 may be replaced with various types of digital devices.

The portable device 100 of the present invention may include a processor 110, a sensor unit 120, and a communication unit 130.

The sensor unit 120 may transfer user input or an environment, which is recognized by the portable device 100, to the processor 110 by using at least one sensor mounted in the portable device 100.

The sensor unit 120 may include a plurality of sensing means. In one embodiment, the plurality of sensing means may include a sensing means such as a gravity sensor, a terrestrial magnetism sensor, a motion sensor, a gyro sensor, an acceleration sensor, an infrared sensor, an inclination sensor, an illumination sensor, a proximity sensor, an altitude sensor, an olfactory sensor, a temperature sensor, a depth sensor, a pressure sensor, a bending sensor, an audio sensor, a video sensor, a microphone, a microphone array, a GPS (Global Positioning System) sensor, or a touch sensor. The aforementioned sensors may be included in the portable device 100 as separate elements, or may be integrated as at least one element and be included.

In accordance with the present embodiment, the sensor unit 120 may detect orientation information of the portable device 100 by using at least one of the aforementioned various sensing means, and transfer the detected orientation information to the processor 110. At this time, the orientation information may include angular information of the portable device 100 for at least one of an x axis, a y axis, and a z axis.

The communication unit 130 may communicate with an external device or a server by using various protocols to transmit/receive data. In accordance with one embodiment of the present invention, the communication unit 130 may perform secure communication with the stationary device 200 by using various types of communication means. At this time, available radio communication means includes NFC (Near Field Communication), Zigbee, infrared communication, Bluetooth, WiFi, a cellular network and the like, and the present invention is not limited thereto. Communication between the portable device 100 and the stationary device 200 may be performed using one of the aforementioned communication means, or may be performed through a combination thereof.

The processor 110 of the present invention may perform various operations of the portable device 100. The processor 110 may execute an operating system, various applications, multimedia content and the like. In accordance with the embodiment of the present invention, the processor 110 may perform various operations for generating a secret key. In addition, the processor 110 may control the aforementioned units of the portable device 100, and may also control data transmission/reception among the units.

The stationary device 200 of the present invention may include a processor 210, a camera unit 220, and a communication unit 230.

In the present embodiment, the configurations of the processor 210 and the communication unit 230 of the stationary device 200 may be equal to or similar to the configurations of the processor 110 and the communication unit 130 of the aforementioned portable device 100. Accordingly, the description about the processor 110 and the communication unit 130 of the aforementioned portable device 100 may be applied to the processor 210 and the communication unit 230 of the stationary device 200 in the same manner.

The camera unit 220 of the stationary device 200 senses an image and transmits the sensed image to the processor 210. In the embodiment of the present invention, the camera unit 220 may include various types of imaging devices such as a depth camera module or an infrared camera module as well as a general CCD (Charge Coupled Device) or CMOS (Complementary Metal-Oxide Semiconductor) camera module.

The portable device 100 and the stationary device 200 illustrated in FIG. 1 are blocks in accordance with the present embodiment, and the separately displayed blocks are illustrated by logically distinguishing the elements of the device. Accordingly, the elements of the aforementioned device may be mounted in the form of one chip or a plurality of chips according to a design of the device.

Figure 2:
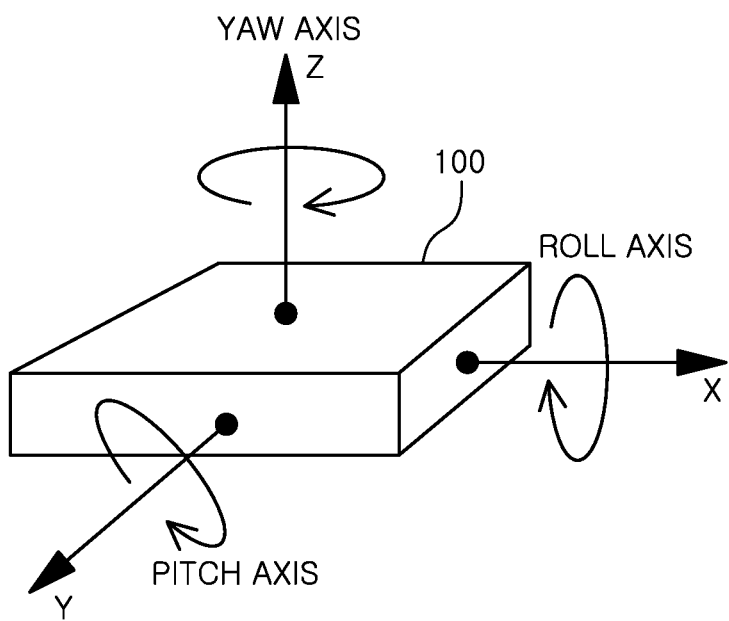
FIG. 2 is a diagram illustrating orientation information of a portable device in accordance with a first embodiment of the present invention.

FIG. 2 illustrates orientation information of the portable device 100 in accordance with the first embodiment of the present invention. In accordance with the present embodiment, the orientation information may include the angular information of the portable device 100 for at least one of the x axis, the y axis, and the z axis.

That is, in accordance with the present embodiment, the orientation information may include azimuth information of the portable device 100 for at least one of the x axis, the y axis, and the z axis. Furthermore, in accordance with another embodiment of the present invention, the orientation information may include rotation angle information of the portable device 100 about at least one of the x axis, the y axis, and the z axis.

Referring to FIG. 2, the rotation angle information of the portable device 100 about arbitrary x axis, y axis, and z axis may be defined as roll, pitch, and yaw information, respectively. However, the present invention is not limited thereto, and respective rotation angle information for the x axis, the y axis, and the z axis may be appropriately set as one of the roll, the pitch, and the yaw information.

The present invention provides a method for generating a secret key to be used for secure communication, by using the sensor unit 120 of the portable device 100 and the camera unit 220 of the stationary device 200. In accordance with the embodiment of the present invention, the degree of inclination of the portable device 100, that is, orientation information may be used as the secret key. At this time, when the orientation information is shared using a communication channel, the third party may intercept the corresponding information. Accordingly, the portable device 100 of the present invention detects the orientation information of the portable device 100 by using a sensor unit, for example, a gyro sensor, and the stationary device 200 estimates the orientation information of the portable device 100 by using an image sensed through the camera unit 220.

Basic setting for orientation information may differ according to devices. For example, in the portable device 100, an axis perpendicular to the ground may be set as a z axis, and in the stationary device 200, an axis perpendicular to the ground may be set as a y axis. Furthermore, a sign of an azimuth or a rotation angle in a specific direction about each axis may differ in each device. Therefore, it is necessary to correct such orientation information between the portable device 100 and the stationary device 200.

Figure 3:
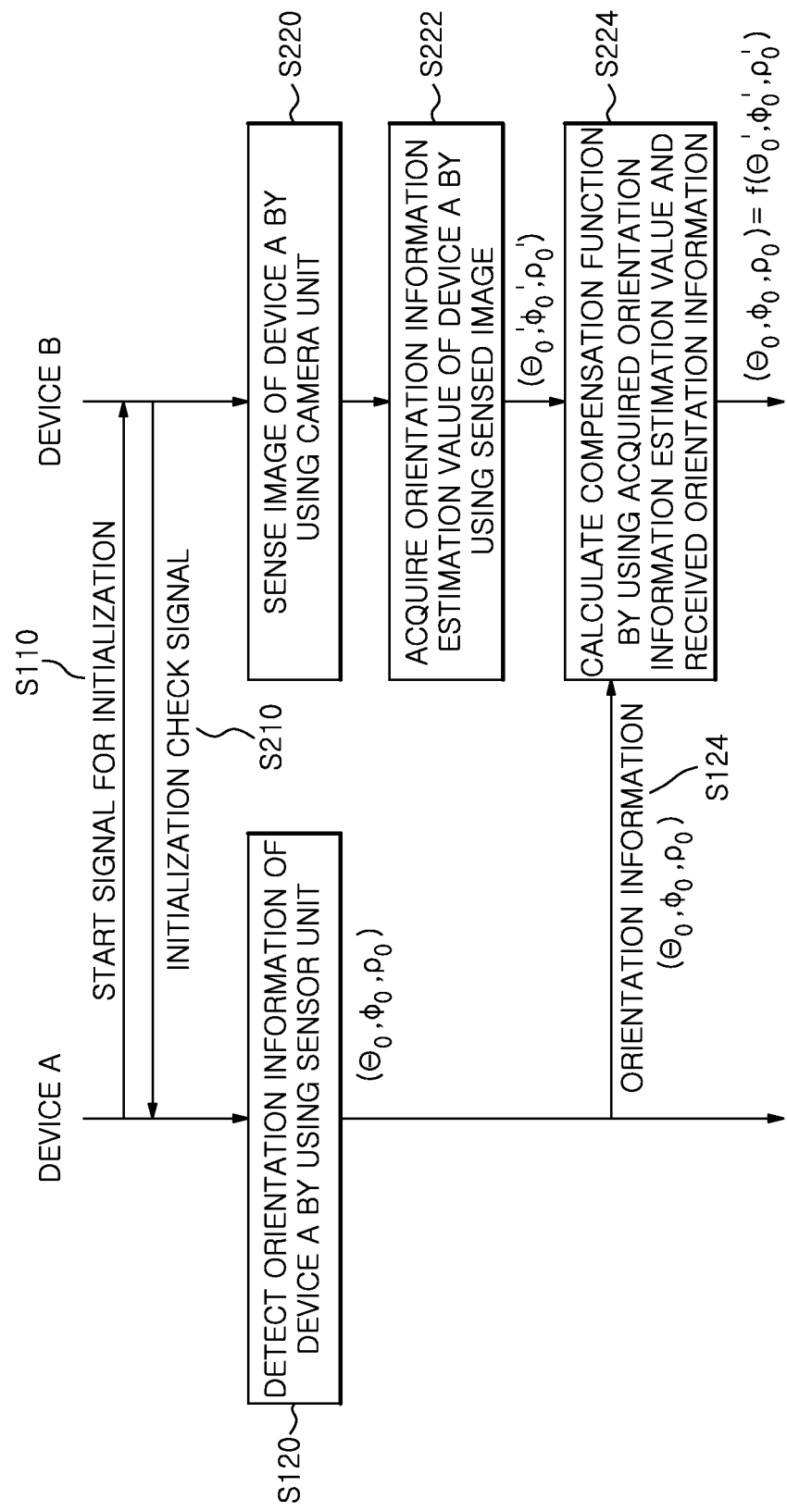
FIG. 3 is a flowchart illustrating an initialization process for secure communication between a portable device and a stationary device in accordance with a first embodiment of the present invention.

FIG. 3 illustrates an initialization process for secure communication between the portable device 100 and the stationary device 200 in accordance with the first embodiment of the present invention. In the present embodiment, the portable device 100 and the stationary device 200 can mutually correct orientation information based on each device, thereby performing an initialization process. In the embodiment of FIG. 3, a device A may correspond to the portable device 100 of FIG. 1 and a device B may correspond to the stationary device 200 of FIG. 1.

The device A transmits a start signal for the initialization process (S110). The device B having received the start signal transmits an initialization check signal (S210). When the device A receives the initialization check signal, the initialization process of the present invention is started.

The device A detects orientation information $\theta_0$, $\phi_0$, and $\rho_0$ of the device A by using a sensor unit (S120). In the present embodiment, the sensor unit is an element mounted in the device A and may include various sensing means as described above. The device B senses an image of the device A by using a camera unit (S220), and acquires an orientation information estimation value $\theta_0'$, $\phi_0'$, and $\rho_0'$ of the device A by using the sensed image (S222). The device B may estimate the orientation information of the device A by using previously stored information on the shape of the device A. At this time, the device B may acquire the orientation information estimation value $\theta_0'$, $\phi_0'$, and $\rho_0'$ by using various image processing techniques.

The device A transmits the orientation information $\theta_0$, $\phi_0$, and $\rho_0$ of the device A detected in step S120 to the device B (S124). Since the orientation information $\theta_0$, $\phi_0$, and $\rho_0$ transmitted in step S124 is not information for generating a secret key, the device A may transmit the orientation information $\theta_0$, $\phi_0$, and $\rho_0$ by using a public communication channel. The device B receives the orientation information $\theta_0$, $\phi_0$, and $\rho_0$ of the device A. Next, the device B calculates a compensation function $f(\theta_0, \phi_0, \rho_0) = f(\theta_0', \phi_0', \text{and } \rho_0')$ by using the received orientation information $\theta_0$, $\phi_0$, and $\rho_0$ and the orientation information estimation value $\theta_0'$, $\phi_0'$, and $\rho_0'$ of step S222 (S224). In accordance with the present embodiment, the device B may compare the received orientation information $\theta_0$, $\phi_0$, and $\rho_0$ with the orientation information estimation value $\theta_0'$, $\phi_0'$, and $\rho_0'$ and match axes having the most similar angular value with each other, thereby calculating the compensation function f.

In accordance with the present embodiment, the device A and the device B may check a current time by using respective sensor units, for example, GPS sensors. Accordingly, the device A and the device B may perform synchronization so as to acquire the orientation information $\theta_0$, $\phi_0$, and $\rho_0$ and the orientation information estimation value $\theta_0'$, $\phi_0'$, and $\rho_0'$ at the same time point.

FIG. 3 illustrates an example in which the device B calculates the compensation function f; however, the present invention is not limited thereto. In accordance with another embodiment of the present invention, the device A may also calculate the compensation function. That is, the device B may acquire an orientation information estimation value $\theta_0'$, $\phi_0'$, and $\rho_0'$ of the device B, and transmit the orientation information estimation value to the device A. The device A may calculate a compensation function $g(\theta_0', \phi_0', \text{and } \rho_0') = g(\theta_0, \phi_0, \text{and } \rho_0)$ by using the received orientation information estimation value $\theta_0'$, $\phi_0'$, and $\rho_0'$ and the orientation information $\theta_0$, $\phi_0$, and $\rho_0$ detected in step S120.

Figure 4:
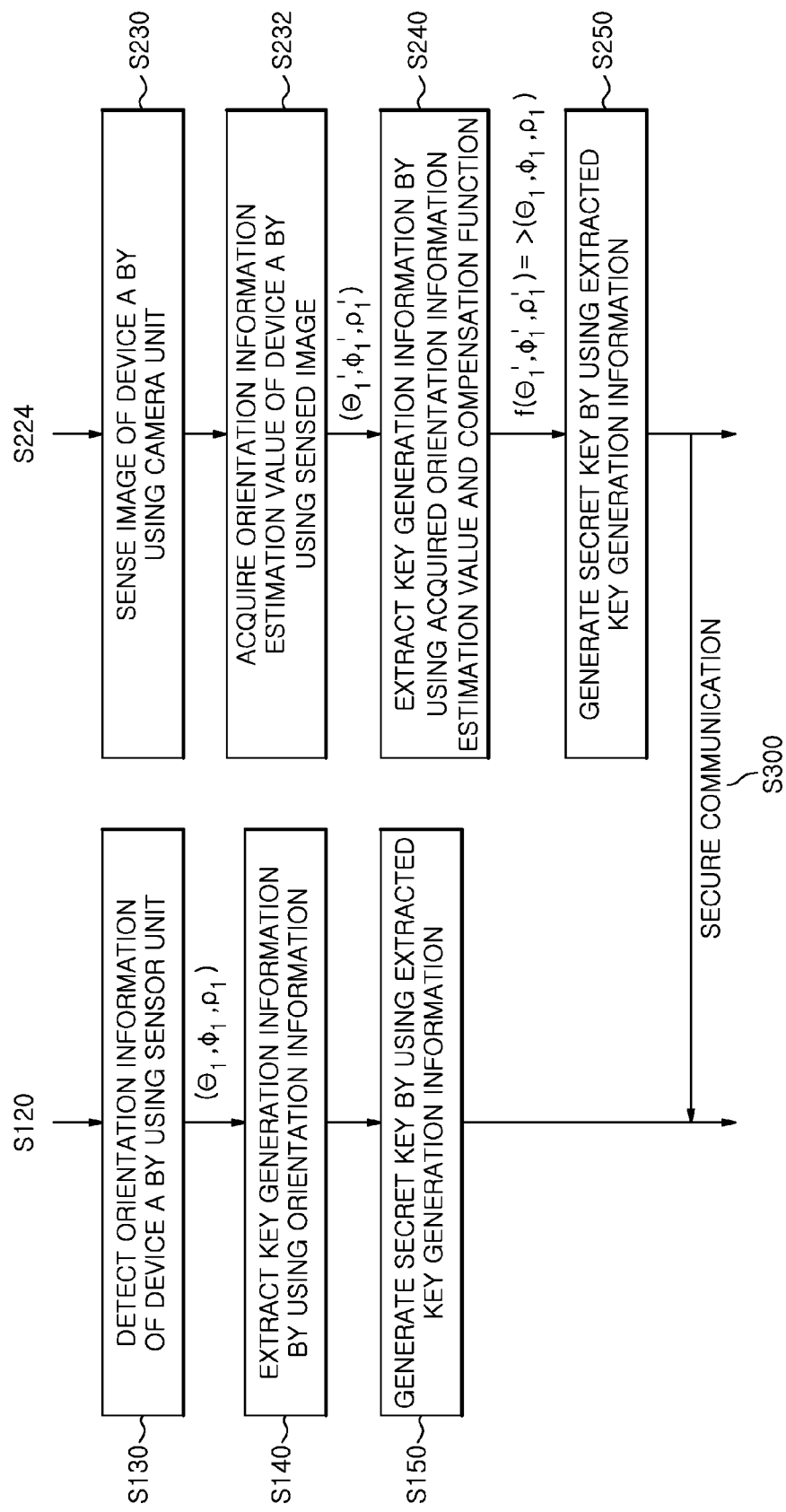
FIG. 4 is a flowchart illustrating a method for performing secure communication in accordance with a first embodiment of the present invention.

FIG. 4 is a flowchart illustrating a method for performing secure communication in accordance with the first embodiment of the present invention. In the embodiment of FIG. 4, a device A may correspond to the portable device 100 of FIG. 1 and a device B may correspond to the stationary device 200 of FIG. 1. Each step described in FIG. 4 may be performed after the initialization process described in FIG. 3 is ended.

The device A detects orientation information $\theta_1$, $\phi_1$, and $\rho_1$ of the device A by using a sensor unit (S130). Next, the device A extracts key generation information by using the orientation information $\theta_1$, $\phi_1$, and $\rho_1$ (S140). In accordance with the present embodiment, the device A may convert the detected orientation information $\theta_1$, $\phi_1$, and $\rho_1$ into a value of a preset quantization step, thereby extracting the key generation information. Next, the device A generates a secret key by using the extracted key generation information (S150). A detailed embodiment of step S140 and step S150 will be described later with reference to FIG. 5.

The device B senses an image of the device A by using a camera unit (S230), and acquires an orientation information estimation value $\theta_1'$, $\phi_1'$, and $\rho_1'$ of the device A by using the sensed image (S232). The device B may estimate the orientation information of the device A by using previously stored information on the shape of the device A. At this time, the device B may acquire the orientation information estimation value $\theta_1'$, $\phi_1'$, and $\rho_1'$ by using various image processing techniques. In accordance with the embodiment of the present invention, the device A and the device B may acquire the orientation information $\theta_1$, $\phi_1$, and $\rho_1$ and the orientation information estimation value $\theta_1'$, $\phi_1'$, and $\rho_1'$ at the same time point by using respective sensor units, for example, GPS sensors as described above.

The device B extracts key generation information by using the acquired orientation information estimation value $\theta_1'$, $\phi_1'$, and $\rho_1'$ and the compensation function f calculated in the embodiment of FIG. 3 (S240). In accordance with the present embodiment, the device B can put the acquired estimation value $\theta_1'$, $\phi_1'$, and $\rho_1'$ into the compensation function f to acquire the orientation information $\theta_1$, $\phi_1$, and $\rho_1$, and extract the key generation information by using the orientation information $\theta_1$, $\phi_1$, and $\rho_1$. Next, the device B generates a secret key by using the extracted key generation information (S250).

In accordance with another embodiment of the present invention, the device B may not calculate the compensation function and the device A may calculate the compensation function g. At this time, the device B may extract the key generation information by using the orientation information estimation value $\theta_1'$, $\phi_1'$, and $\rho_1'$ acquired in step S232, and generate the secret key. Meanwhile, the device A may extract the key generation information by using the orientation information $\theta_1$, $\phi_1$, and $\rho_1$ and the compensation function g, and generate the secret key.

As described above, in accordance with the present embodiment, one of the device A and the device B can correct the orientation information (or the estimation value) by using the compensation function, so that the two devices can extract the same key generation information and generate the same secret key. Consequently, the device A and the device B can perform secure communication employing a symmetrical key encryption scheme.

The device A and the device B of the present invention perform secure communication by using the generated secret key (S300). In detail, the device A may encrypt data by using the secret key generated in step S150 and transmit the encrypted data to the device B. Furthermore, the device A may receive data from the device B and decrypt the received data by using the secret key generated in step S150. Similarly, the device B may encrypt data by using the secret key generated in step S250 and transmit the encrypted data to the device A. Furthermore, the device B may receive data from the device A and decrypt the received data by using the secret key generated in step S250.

Figure 5:
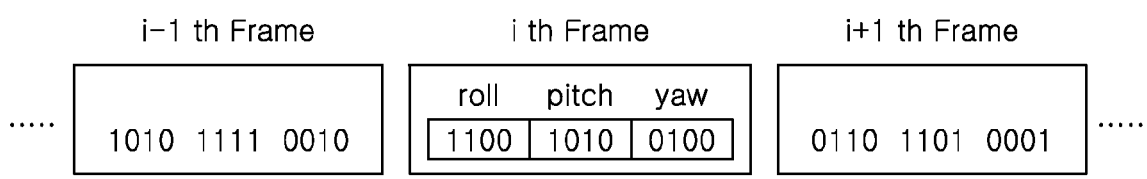
FIG. 5 is a diagram illustrating a method for generating a secret key in accordance with a first embodiment of the present invention.

FIG. 5 illustrates a method for generating a secret key in accordance with the first embodiment of the present invention. With reference to FIG. 5, a process, in which the portable device of the present invention generates a secret key by using orientation information, will be described. Furthermore, the stationary device of the present invention may also generate a secret key by using an orientation information estimation value (or a value corrected using a compensation function) in the same method.

In accordance with the present embodiment, the portable device can convert detected orientation information into a value of a preset quantization step, thereby extracting key generation information. Referring to FIG. 5, the portable device quantizes roll, pitch, and yaw values of the portable device measured at a specific time point to 16 (=2$^4$) steps, respectively.

Accordingly, when each of the quantized roll, pitch, and yaw values is represented by a binary number, it may be represented as information of 4 bits and has one value of 0000 to 1111. As described above, when the quantized information of 4 bits is combined, a secret key of 12 bits may be formed. That is, when the orientation information of the portable device is quantized to N pieces for each axis in accordance with the present embodiment, the number of combinations of generated secret keys is N3. In FIG. 5, the orientation information of the portable device is quantized in sequence of a roll, a pitch, and a yaw to generate a secret key; however, the present invention is not limited thereto. The sequence of the roll, the pitch, and the yaw may be changed.

In accordance with another embodiment of the present invention, the orientation information of the portable device may include angular information of the portable device detected for a preset time D at a preset time interval T. At this time, the portable device may convert the orientation information detected for each time interval T into a value of a quantization step, and extract key generation information. As described above, in the orientation information of the portable device, when a measurement range of each axis in divided into N sections and the orientation information is quantized, the number of key generation information generated for each frame is N3. When key generation information is acquired for the time D at each time interval T, the total number of combinations of secret keys acquirable by the portable device is N3D/T.

That is, the portable device in accordance with the present embodiment may generate a secret key by using orientation information for one frame at a specific time point, but may also generate a secret key by using orientation information for a plurality of frames for a predetermined time.

In the embodiment of FIG. 5, the portable device may acquire key generation information of 12 bits for each frame. If it is assumed that D=1[sec] and T=1[sec], the total length of a secret key acquired by the portable device is 12×1×30=360 bits. Lengths of secret keys, which are used in an AES (Advanced Encryption Standard) technique generally used at the present time, are 128, 196, and 256 bits. Consequently, the portable device in accordance with the present embodiment can generate a secret key with a sufficient length for secure communication.

Figure 6:
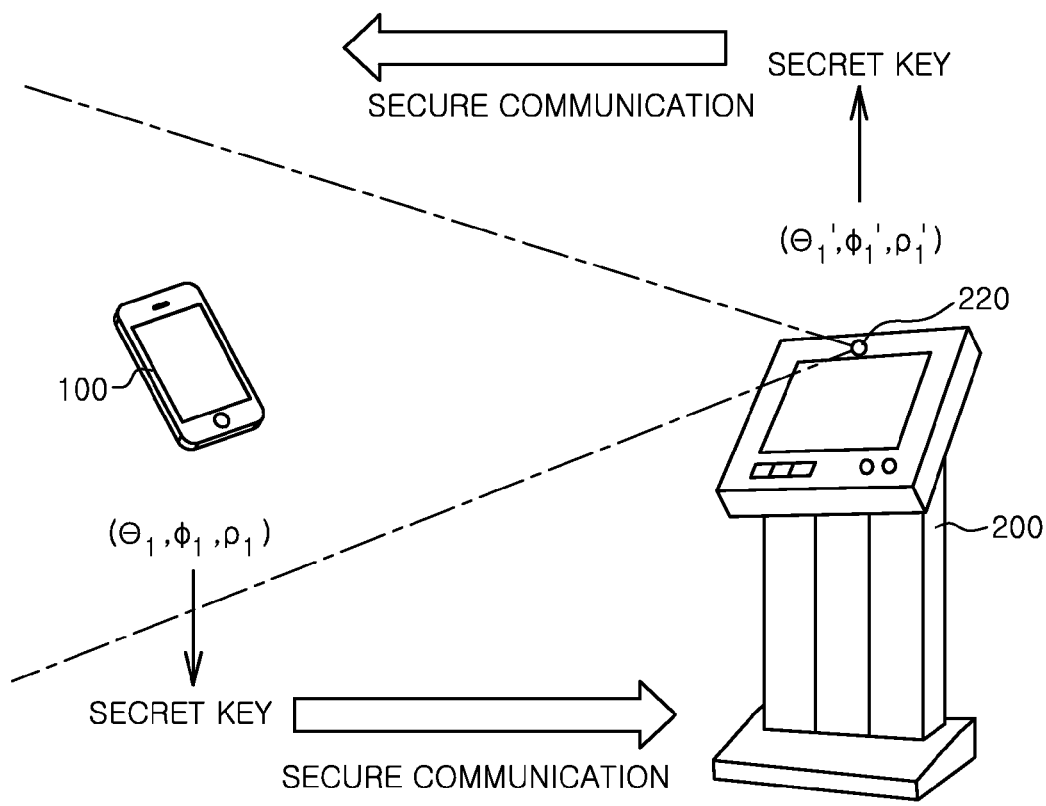
FIG. 6 is a schematic diagram illustrating an example in which a portable device and a stationary device perform secure communication in accordance with a first embodiment of the present invention.

FIG. 6 illustrates an example in which the portable device 100 and the stationary device 200 perform secure communication in accordance with the first embodiment of the present invention.

As described above, the portable device 100 of the present invention acquires the orientation information $\theta_1$, $\phi_1$, and $\rho_1$ of the portable device 100 by using the sensor unit, and the stationary device 200 acquires the orientation information estimation value $\theta_1'$, $\phi_1'$, and $\rho_1'$ of the portable device 100 by using the camera unit 220. The portable device 100 generates a secret key by using the orientation information $\theta_1$, $\phi_1$, and $\rho_1$, and the stationary device 200 generates a secret key by using the orientation information estimation value $\theta_1'$, $\phi_1'$, and $\rho_1'$.

In the portable device 100 and the stationary device 200, references for each orientation information may be different from each other, and key generation information of the two devices may be allowed to be equal to each other by using the compensation function described with reference to FIG. 3. The portable device 100 and the stationary device 200 can mutually perform secure communication by using generated respective secret keys. As described above, the portable device 100 and the stationary device 200 in accordance with the present embodiment can share a secret key by using a separate means other than a communication channel, thereby efficiently performing secure communication in an ad-hoc network environment.

[Second Embodiment]

Figure 7:
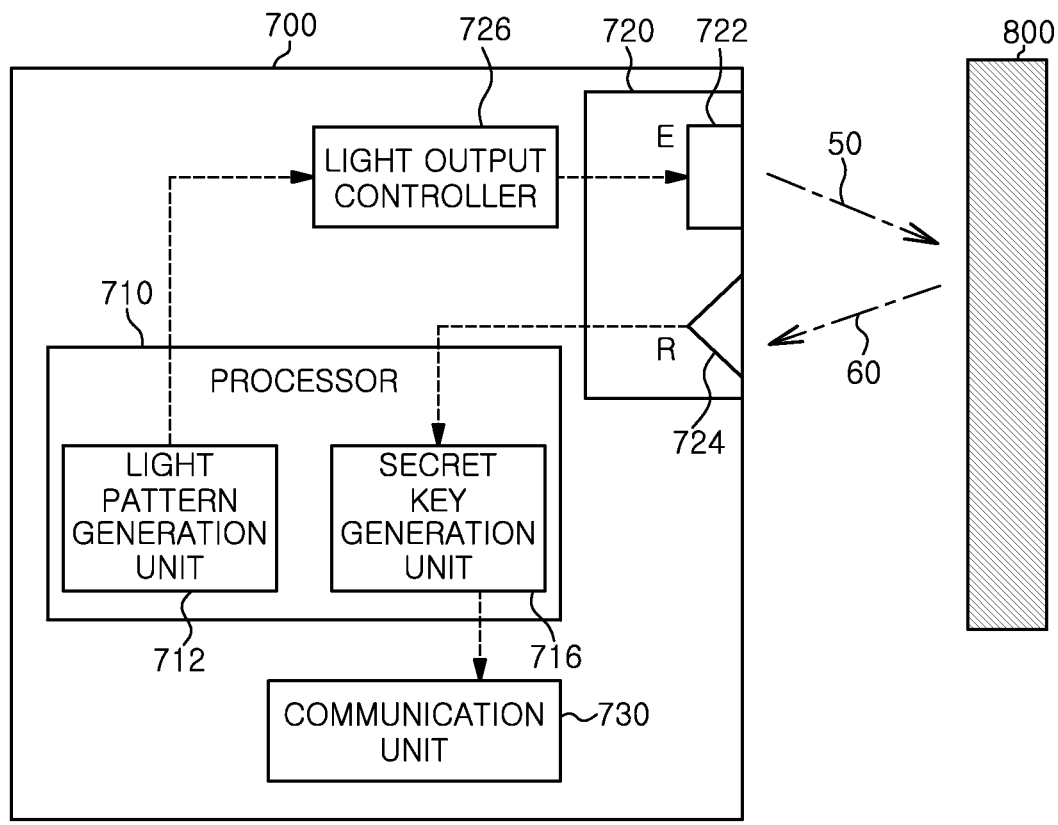
FIG. 7 is a block diagram illustrating a digital device in accordance with another embodiment of the present invention.

FIG. 7 is a block diagram illustrating a digital device 700 in accordance with another embodiment of the present invention. Referring to FIG. 7, the digital device 700 of the present invention may include a processor 710, a proximity sensor 720, and a communication unit 730.

The proximity sensor 720 includes a radiator 722 that outputs light by using a LED (Light Emitting Diode) and the like, and a receiver 724 that detects light by using a phototransistor and the like. The radiator 722 may output a light pattern 50 under the control of a light output controller 726. The light output controller 726 may be included in the proximity sensor 720, and may also be provided separately from the proximity sensor 720. If a specific object 800 is located sufficiently near the proximity sensor 720, the light pattern 50 output from the radiator 722 is reflected by the object 800. At this time, the receiver 724 of the proximity sensor 720 can receive the reflected light pattern 60, so that the proximity sensor 720 can detect whether the object 800 is located closely to the digital device 700.

The communication unit 730 may communicate with an external device or a server by using various protocols, thereby transmitting/receiving data. In accordance with the present embodiment, the communication unit 730 can perform secure communication with the external device by using various types of communication means. At this time, available radio communication means includes NFC (Near Field Communication), Zigbee, infrared communication, Bluetooth, WiFi, a cellular network and the like, and the present invention is not limited thereto. Communication between the digital device 700 and the external device may be performed using one of the aforementioned communication means, or may be performed through a combination thereof.

The processor 710 of the present invention may perform various operations of the digital device 700. The processor 710 may execute an operating system, various applications, multimedia content and the like. In accordance with the present embodiment, the processor 710 may perform various operations for generating a secret key. The processor 710 may include a light pattern generation unit 712 and a secret key generation unit 716. The light pattern generation unit 712 generates the light pattern 50 that is output from the radiator 722. That is, the light pattern generation unit 712 generates a specific pattern to transfer the specific pattern to the light output controller 726, and the light output controller 726 outputs light with the received pattern by using the radiator 722.

The secret key generation unit 716 generates a secret key by using a light pattern. In accordance with the present embodiment, the secret key generation unit 716 can extract key generation information by using a light pattern 60 received by the receiver 724, and generate a secret key by using the extracted key generation information. In addition, the processor 710 can control each unit of the aforementioned digital device 700, and can also data transmission/reception among the units.

In accordance with the present embodiment, the digital device 700 may include a sensor unit (not illustrated). The sensor unit may transfer user input or an environment, which is recognized by the digital device 700, to the processor 710 by using at least one sensor mounted in the digital device 700. At this time, the sensor unit may include a plurality of sensing means. In one embodiment, the plurality of sensing means may include a sensing means such as a gravity sensor, a terrestrial magnetism sensor, a motion sensor, a gyro sensor, an acceleration sensor, an infrared sensor, an inclination sensor, an illumination sensor, a proximity sensor, an altitude sensor, an olfactory sensor, a temperature sensor, a depth sensor, a pressure sensor, a bending sensor, an audio sensor, a video sensor, a microphone, a microphone array, a GPS (Global Positioning System) sensor, or a touch sensor. The aforementioned sensors may be included in the digital device 700 as separate elements, or may be integrated as at least one element and be included. In accordance with the present embodiment, the sensor unit may detect orientation information of the digital device 700 by using at least one of the aforementioned various sensing means, and transfer the detected orientation information to the processor 710. At this time, the orientation information may include angular information of the digital device 700 for at least one of an x axis, a y axis, and a z axis.

Figure 8:
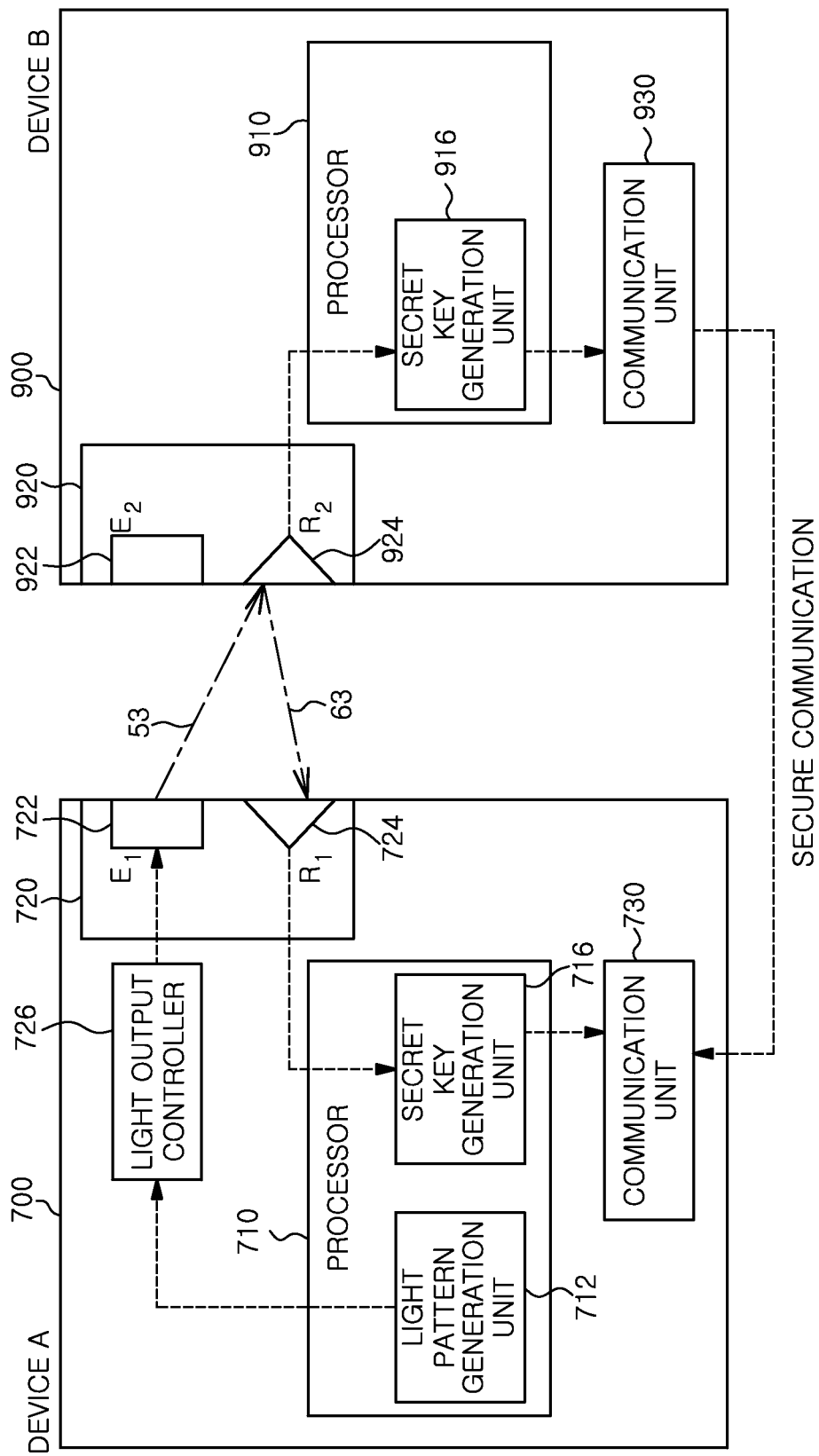
FIG. 8 is a block diagram illustrating a digital device and an external device in accordance with a second embodiment of the present invention.

FIG. 8 is a block diagram illustrating the digital device 700 and an external device 900 in accordance with the second embodiment of the present invention. In FIG. 8, each configuration of the digital device 700 is as described in FIG. 7, and the external device 900 may include a configuration equal to or corresponding to that of the digital device 700.

When the light pattern generation unit 712 of the digital device 700 generates a pattern for secure communication and transfers the pattern to the light output controller 726, the light output controller 726 controls the radiator 722 (E1) to output a first light pattern 53. As illustrated in FIG. 8, when the proximity sensor 720 of the digital device 700 and a proximity sensor 920 of the external device 900 are located closely to each other, a receiver 924 (R2) of the external device 900 may receive the first light pattern 53. A receiver 724 (R1) of the digital device 700 may receive a second light pattern 63 reflected by the external device 900. When the first light pattern 53 is reflected by the external device 900 and the second light pattern 63 is generated, the first light pattern 53 and the second light pattern 63 may include the same pattern information. That is, in accordance with the present embodiment, both the receiver 724 (R1) of the digital device 700 and the receiver 924 (R2) of the external device 900 may receive a light pattern that has been output by the radiator 722 (E1) of the digital device 700.

The secret key generation unit 716 of the digital device 700 generates a secret key by using the second light pattern 63 acquired by the receiver 724 (R1). Furthermore, the secret key generation unit 916 of the external device 900 generates a secret key by using the first light pattern acquired by the receiver 924 (R2). In the present embodiment, when the proximity sensor 720 of the digital device 700 and the proximity sensor 920 of the external device 900 make close contact with each other, a secret key generated by each device may be the same secret key. The communication unit 730 of the digital device 700 and a communication unit 930 of the external device 900 may perform secure communication by using the generated secret keys. If at least one of the secret key generation unit 716 of the digital device 700 and the secret key generation unit 916 of the external device 900 fails in generating a secret key, secure communication between the two devices is not possible. In accordance with the present embodiment, the light pattern generation unit 712 of the digital device 700 can generate a light pattern for secret key generation again. The light pattern generated again may be different from the previously output first light pattern 53.

In accordance with the present embodiment, the digital device 700 and the external device 900 can safely share a secret key for secure communication. If the digital device 700 is not located sufficiently near the external device 900, the second light pattern 63 received by the receiver 724 (R1) after being reflected is very weak. Therefore, the digital device 700 is not able to generate a secret key. Furthermore, if the two devices are remote from each other, the first light pattern 53 received by the receiver 924 (R2) is also very weak. In this case, the external device 900 is not also able to generate a secret key. That is, in accordance with the embodiment of the present invention, the digital device 700 and the external device 900 can share a secret key only when they make close contact with each other, so that it is possible to prevent secret key information from being leaked to the third party.

The digital device 700 and the external device 900 illustrated in FIG. 7 and FIG. 8 are blocks in accordance with the present embodiment, and the separately displayed blocks are illustrated by logically distinguishing the elements of the device. Accordingly, the elements of the aforementioned device may be mounted in the form of one chip or a plurality of chips according to a design of the device.

Figure 9:
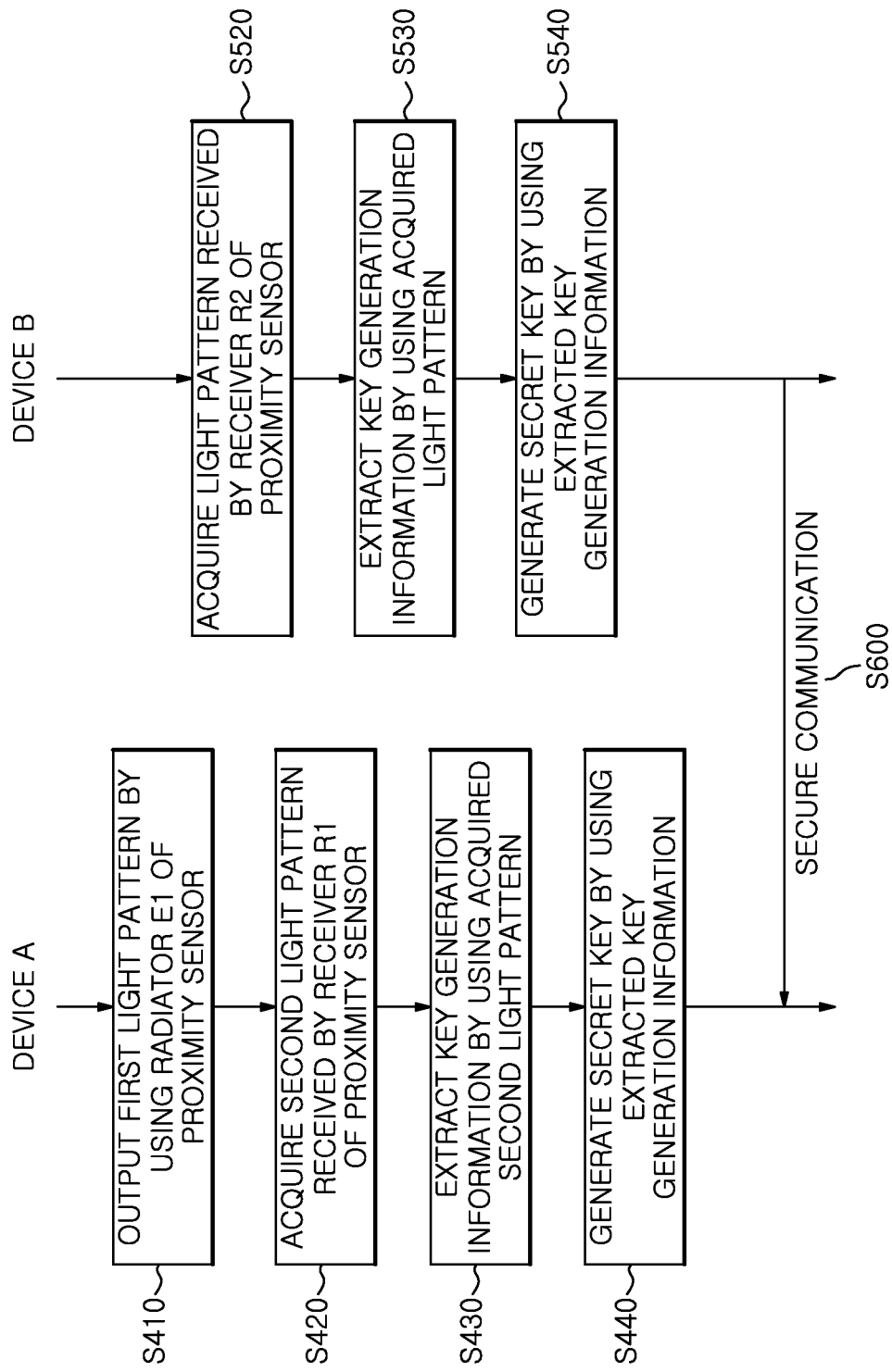
FIG. 9 is a flowchart illustrating a method for performing secure communication in accordance with a second embodiment of the present invention.

FIG. 9 is a flowchart illustrating a method for performing secure communication in accordance with the second embodiment of the present invention. In the embodiment of FIG. 9, a device A may correspond to the digital device 700 of FIG. 8 and a device B may correspond to the external device 900 of FIG. 8.

The device A outputs a first light pattern by using the radiator E1 of a proximity sensor (S410). The first light pattern includes pattern information generated by a light pattern generation unit of the device A. Next, the device A acquires a second light pattern received by the receiver R1 of the proximity sensor (S420). In accordance with the present embodiment, when the device A and the device B are located closely to each other, the second light pattern received by the receiver R1 includes pattern information equal to that of the first light pattern that has been output by the radiator E1.

In accordance with another embodiment, when the second light pattern is not received for a preset time, the device A may stop the output of the first light pattern. When the second light pattern is not received in the receiver R1 of the device A, the device A and the device B may not make close contact with each other. When the device A and the device B do not make close contact with each other, since the first light pattern that is output by the radiator E1 of the device A may be exposed to an exterior, the device A stops the output of the first light pattern.

In accordance with further another embodiment of the present invention, the device A can detect orientation information of the device A by using a sensor unit, and output the first light pattern based on the detected orientation information. That is, when the detected orientation of the device A is preset orientation, the device A may output the first light pattern. If orientation of the device B of the device A and the device B, which make close contact with each other, satisfies the preset orientation, the device A may not output a light pattern and the device B may output a light pattern. Consequently, in accordance with the present embodiment, it is possible to give a priority for the output of a light pattern to one of the device A and the device B.

The device A of the present invention extracts key generation information by using the acquired second light pattern (S430). In accordance with the present embodiment, the device A may quantize the received second light pattern at a preset time interval, and detect whether light is sensed 'ON/OFF' in each time interval. In accordance with one embodiment, the device A may set an interval 'ON', in which light is sensed, to 1 and an interval 'OFF', in which no light is sensed, to 0, and extract binary key generation information in each time interval. However, the present invention is not limited thereto. For example, the device A may also set an interval, in which light is sensed, to 0 and an interval, in which no light is sensed, to 1, and extract binary key generation information.

In accordance with the present embodiment, the device A may acquire information of the first light pattern that has been output by the radiator E1. That is, a processor of the device A may acquire the information of the first light pattern generated by the light pattern generation unit, and compare the first light pattern with the received second light pattern. If the second light pattern includes pattern information equal to that of the first light pattern, the device A may extract key generation information by using the second light pattern. However, when the second light pattern does not include the pattern information equal to that of the first light pattern, the device A may stop the extraction of the key generation information, and receive a new light pattern by using the receiver R1.

Then, the device A of the present invention generates a secret key by using the extracted key generation information (S440). In accordance with the present embodiment, the device A can generate a secret key by using key generation information on a preset time interval. As the preset time interval is long, a secret key has a large amount of data.

The device B acquires a light pattern received by the receiver R2 of a proximity sensor (S520). In accordance with the present embodiment, when the device A and the device B are located closely to each other, the light pattern received by the receiver R2 includes pattern information equal to that of the first light pattern that has been output by the radiator E1.

Next, the device B of the present invention extracts key generation information by using the acquired light pattern (S530). A method, in which the device B extracts the key generation information, is as described in step S430. Then, the device B generates a secret key by using the extracted key generation information (S540). In accordance with the present embodiment, the device B can generate a secret key by using key generation information on the same time interval as that of the device A. In accordance with the present embodiment, the device A and the device B can check a current time by using respective sensor units, for example, GPS sensors. Consequently, the device A and the device B can perform synchronization such that the receivers R1 and R2 acquire light patterns for the same time point, respectively.

The device A and the device B of the present invention perform secure communication by using the generated secret keys (S600). In detail, the device A may encrypt data by using the secret key generated in step S440 and transmit the encrypted data to the device B. Furthermore, the device A may receive data from the device B and decrypt the received data by using the secret key generated in step S440. Similarly, the device B may encrypt data by using the secret key generated in step S540 and transmit the encrypted data to the device A. Furthermore, the device B may receive data from the device A and decrypt the received data by using the secret key generated in step S540.

[Third Embodiment]

Figure 10:
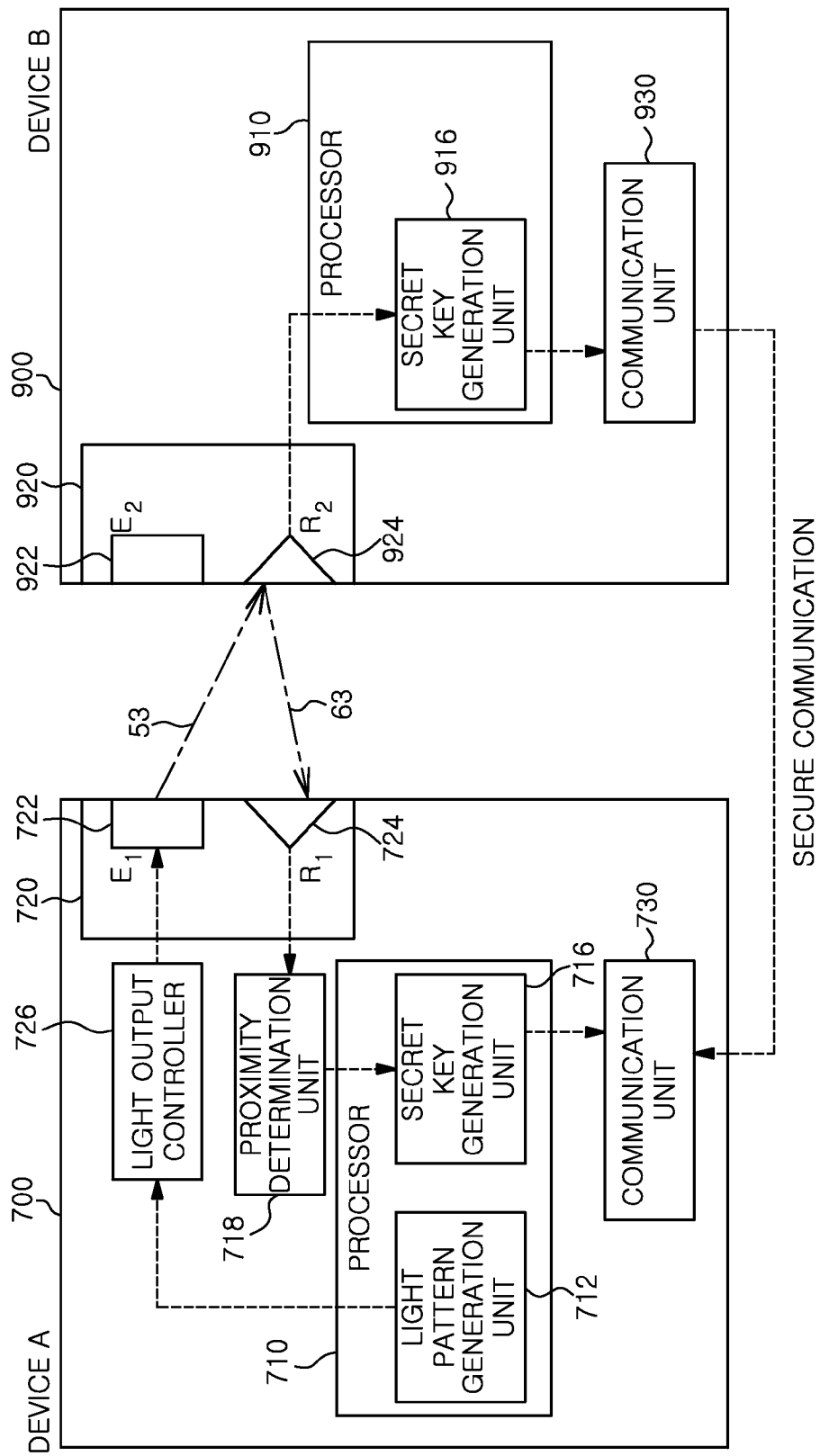
FIG. 10 is a block diagram illustrating a digital device and an external device in accordance with a third embodiment of the present invention.

FIG. 10 is a block diagram illustrating the digital device 700 and the external device 900 in accordance with a third embodiment of the present invention. In the embodiment of FIG. 10, a description about parts equal to or corresponding to the embodiment of FIG. 8 will be omitted.

In the embodiment of FIG. 8, the digital device 700 generates a secret key by using a second light pattern 65 received by the receiver 724 (R1). However, in the embodiment of FIG. 10, the digital device 700 generates a secret key by using light pattern information directly transferred from the light pattern generation unit 712. That is, the secret key generation unit 716 of the digital device 700 directly acquires information on a light pattern 55, which has been output by the radiator 722 (E1), from the light pattern generation unit 712. The secret key generation unit 716 may extract key generation information by using information on the acquired light pattern 55.

The digital device 700 may include a proximity determination unit 718 that determines whether an object is located closely to the digital device 700 based on a sensing value of the receiver R1. The proximity determination unit 718 may be included in the proximity sensor 720, or may be provided separately from the proximity sensor 720. The proximity determination unit 718 detects whether the object is located closely to the digital device 700 based on the light pattern 65 received by the receiver 724 (R1), and transfers a detected result to the processor 710. When the object approaches within a preset range, the secret key generation unit 716 extracts key generation information by using the light pattern 55 that has been output by the radiator 722 (E1). As described above, the device A can check whether the device B sufficiently approaches the device A enough for performing secure communication, and generate a secret key only when the device B sufficiently approaches. However, when the device B does not sufficiently approach the device A, the light pattern 55 that has been output by the radiator 722 (E1) of the device A may be exposed to an exterior. Accordingly, when the object does not approach the device A within a preset range for a preset time, the device A stops the output of the light pattern 55 by the radiator 722 (E1).

Figure 11:
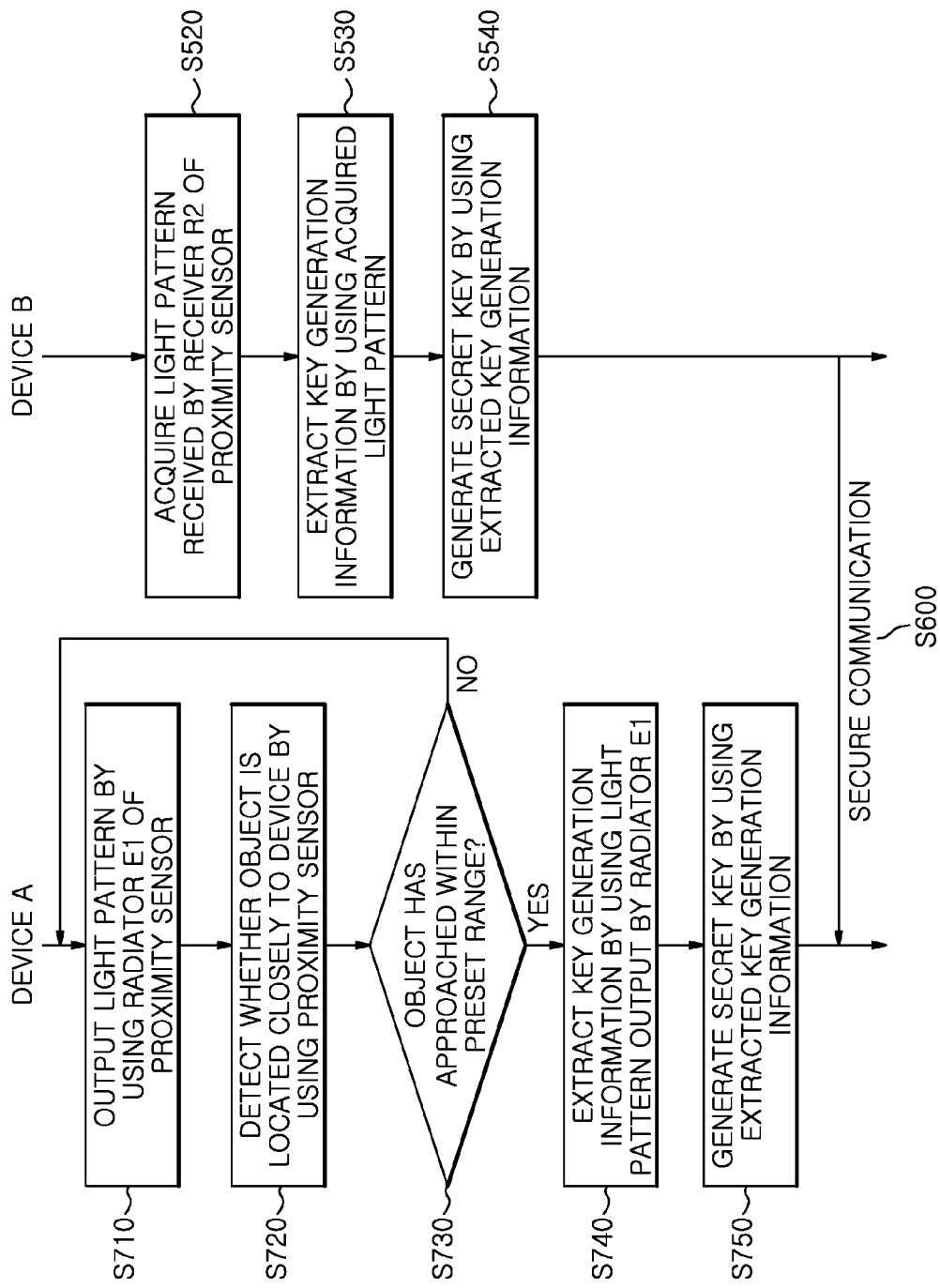
FIG. 11 is a flowchart illustrating a method for performing secure communication in accordance with a third embodiment of the present invention.

FIG. 11 is a flowchart illustrating a method for performing secure communication in accordance with the third embodiment of the present invention. In the embodiment of FIG. 11, a device A may correspond to the digital device 700 of FIG. 10 and a device B may correspond to the external device 900 of FIG. 10. In the embodiment of FIG. 11, a description about parts equal to or corresponding to the embodiment of FIG. 9 will be omitted.

The device A outputs a light pattern by using the radiator E1 of a proximity sensor (S710). The light pattern includes pattern information generated by a light pattern generation unit of the device A. Next, the device A detects whether an object is located closely to the device A by using the proximity sensor (S720). A proximity determination unit of the device A may determine whether the object is located closely to the device A based on the light pattern received by the receiver R1 of the device A. The device A determines whether the object has approached the device A within a preset range (S730).

When the object has approached the device A within the preset range, the device A extracts key generation information by using the light pattern that has been output by the radiator E1 (S740). Then, the device A generates a secret key by using the extracted key generation information (S750). In the present embodiment, the secret key generation unit of the device A can directly acquire information on the light pattern, which has been output by the radiator E1, from the light pattern generation unit. A detailed embodiment for a method, in which the device A extracts the key generation information by using the light pattern, and a method, in which the device A generates the secret key, is as described with reference to FIG. 9.

In step S730, it is determined that the object has not approached the device A within the preset range, the device A may return to step S710 instead of extracting the key generation information. In accordance with another embodiment of the present invention, when the object does not approach the device A within a preset range for a preset time, the device A can stop the output of the light pattern.

In accordance with further another embodiment of the present invention, the device A can detect orientation information of the device A by using a sensor unit, and output a light pattern based on the detected orientation information. That is, when the detected orientation of the device A is preset orientation, the device A may output the light pattern. If orientation of the device B of the device A and the device B, which make close contact with each other, satisfies the preset orientation, the device A may not output a light pattern and the device B may output a light pattern. Consequently, in accordance with the present embodiment, it is possible to give a priority for the output of a light pattern to one of the device A and the device B.

The device A and the device B of the present invention perform secure communication by using the generated secret keys (S600). In detail, the device A may encrypt data by using the secret key generated in step S750 and transmit the encrypted data to the device B. Furthermore, the device A may receive data from the device B and decrypt the received data by using the secret key generated in step S750. Similarly, the device B may encrypt data by using the secret key generated in step S540 and transmit the encrypted data to the device A. Furthermore, the device B may receive data from the device A and decrypt the received data by using the secret key generated in step S540.

Figure 12:
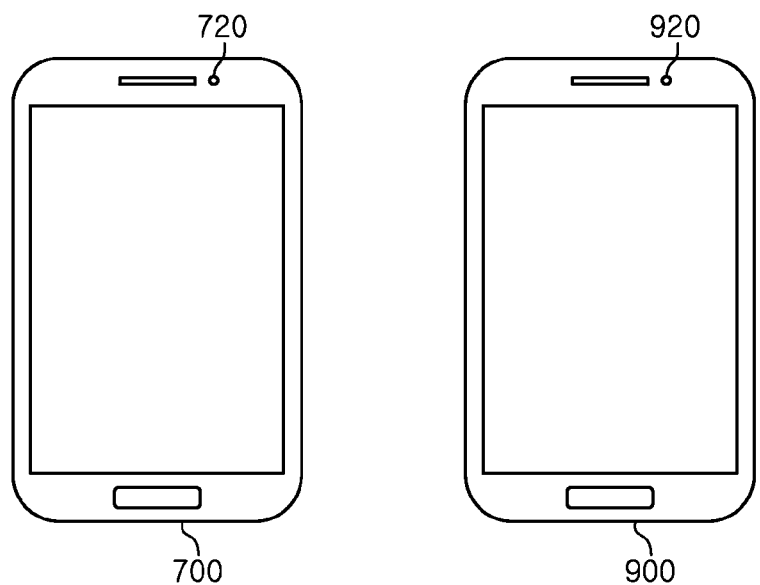
FIG. 12 is a schematic diagram illustrating a digital device and an external device in accordance with another embodiment of the present invention.

FIG. 12 is a schematic diagram illustrating a digital device and an external device in accordance with another embodiment of the present invention.

As illustrated in FIG. 12, the digital device 700 and the external device 900 in accordance with another embodiment of the present invention may include the proximity sensors 720 and 920, respectively. In accordance with the present embodiment, when the proximity sensor 720 of the digital device 700 and the proximity sensor 920 of the external device 900 make close contact with each other while facing each other, the two devices can share a secret key for secure communication. At this time, since the two devices do not use a separate communication channel while sharing the secret key, it is possible to prevent the secret key from being intercepted by the third party.

Figure 13A:
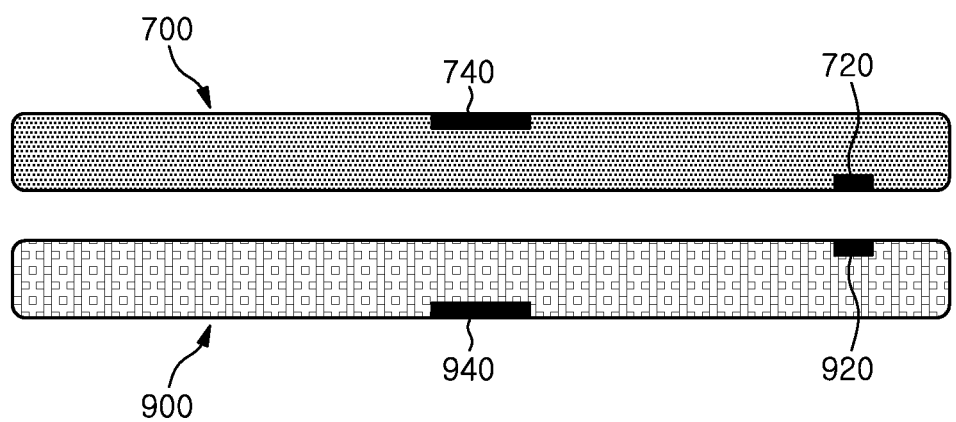
FIGS. 13A and 13B are schematic diagrams illustrating methods in which a digital device and an external device perform secure communication in accordance with further another embodiment of the present invention.
Figure 13B:
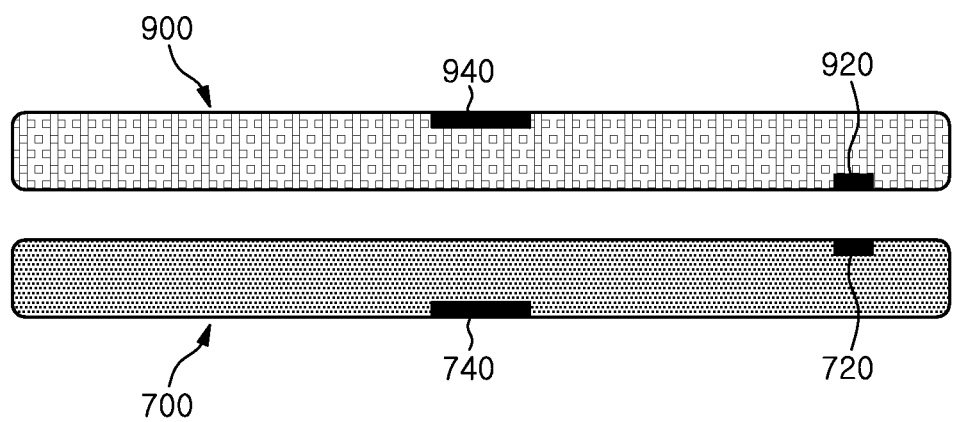

FIGS. 13A and 13B are schematic diagrams illustrating methods in which the digital device 700 and the external device 900 perform secure communication in accordance with further another embodiment of the present invention. In accordance with the embodiments of FIGS. 13A and 13B, in the digital device 700 and the external device 900, sides, at which the proximity sensors 720 and 920 of the devices are provided, correspond to front surfaces.

When the digital device 700 and the external device 900 perform secure communication in accordance with the present embodiment, it is necessary to give a priority to one of the two devices, which is to output a light pattern, and the other of the two devices, which is to receive the light pattern. In accordance with the present embodiment, the digital device 700 and the external device 900 can decide the priority based on orientation information of each device. The digital device 700 and the external device 900 may include sensor units 740 and 940 for detecting respective orientation information, respectively.

In accordance with the present embodiment, the digital device 700 and the external device 900 may have preset orientation information for outputting a light pattern. For example, in the case in which a device is set to output a light pattern when a front surface of the device faces downward, and is set to receive the light pattern when the front surface of the device faces upward, the digital device 700 may output a light pattern and the external device 900 may receive the light pattern of the digital device 700 as illustrated in FIG. 13A. In FIG. 13b, the external device 900 may output a light pattern and the digital device 700 may receive the light pattern of the external device 900. In contrast, in the case in which a device is set to output a light pattern when a front surface of the device faces upward, and is set to receive the light pattern when the front surface of the device faces downward, the external device 900 may output a light pattern in FIG. 13A and the digital device 700 may output a light pattern in FIG. 13B. At this time, in FIG. 13A, the digital device 700 may receive the light pattern of the external device 900, and in FIG. 13B, the external device 900 may receive the light pattern of the digital device 700. However, the priority of the light pattern output device according to the orientation of the device as described above is for illustrative purposes only, and may be changed in various embodiments.

As described above, the digital device 700 and the external device 900 in accordance with the present embodiment can adjust the output of light patterns based on the orientation information of each device, thereby preventing all the two devices from outputting light patterns and deciding a priority of a device that generates a secret key.

Figure 14:
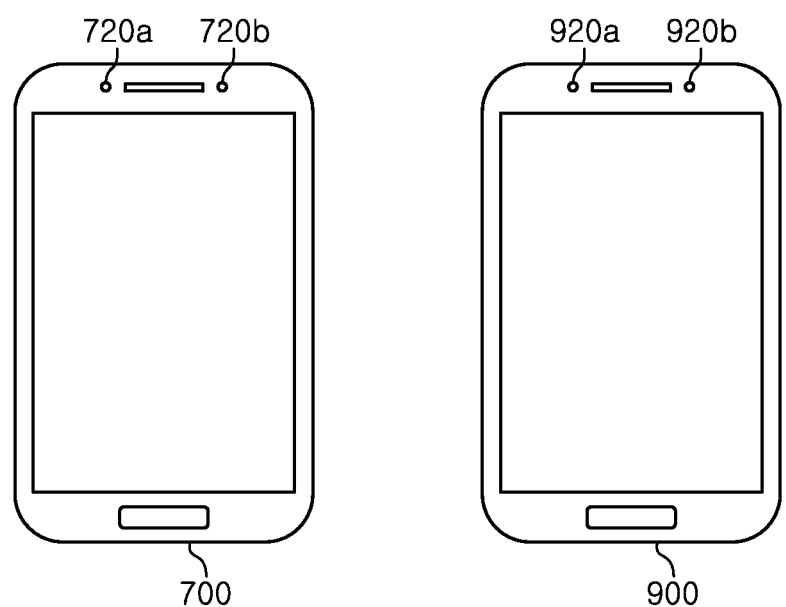
FIG. 14 is a schematic diagram illustrating a digital device and an external device in accordance with further another embodiment of the present invention.

FIG. 14 is a schematic diagram illustrating the digital device 700 and the external device 900 in accordance with further another embodiment of the present invention.

In accordance with the present embodiment, the digital device 700 may include a plurality of proximity sensors 720a and 720b. The external device 900 may also include a plurality of proximity sensors 920a and 920b. In accordance with the present embodiment, in order for allowing the digital device 700 to share a secret key with the external device 900, the proximity sensor 720a may face the proximity sensor 920b and the proximity sensor 720b may face the proximity sensor 920a. When each device includes a plurality of proximity sensors, a proximity sensor for outputting a light pattern may be decided in advance from among the plurality of proximity sensors. For example, a proximity sensor positioned at the left of the device may be set to output a light pattern and a proximity sensor positioned at the right may be set to receive the light pattern of a counterpart device. At this time, the digital device 700 may generate a light pattern to output the light pattern to the proximity sensor 720a, and the external device 900 may receive the light pattern through the proximity sensor 920b thereof. Furthermore, the external device 900 may generate a light pattern to output the light pattern to the proximity sensor 920a, and the digital device 700 may receive the light pattern through the proximity sensor 720b thereof. Consequently, as illustrated in FIG. 14, when each device includes the two proximity sensors, the two devices can share two secret keys.

In accordance with further another embodiment of the present invention, the digital device 700 and the external device 900 can perform secure communication by using two generated secret keys. For example, when a secret key generated by the digital device 700 is set to a 'secret key A' and a secret key generated by the external device 900 is set to a 'secret key B', the digital device 700 can encrypt data by using the 'secret key A' and then transmit the encrypted data to the external device 900, and the external device 900 can decrypt the received data by using the 'secret key A'. Furthermore, the external device 900 can encrypt data by using the 'secret key B' and then transmit the encrypted data to the digital device 700, and the digital device 700 can decrypt the received data by using the 'secret key B'. In addition, it is of course that data transmitted from the digital device 700 to the external device 900 may be encrypted by the 'secret key B' and data transmitted from the external device 900 to the digital device 700 may be encrypted by the 'secret key A'. As described above, the digital device 700 and the external device 900 in accordance with the present embodiment can use encryption keys different from each other in data transmission and data reception.

While the invention has been shown and described with respect to the preferred embodiments, the present invention is not limited thereto. It will be understood by those skilled in the art that various changes and modifications may be made without departing from the scope of the invention as defined in the following claims.

What is claimed as:

1. A method using a stationary device for secure communication between the stationary device and a portable device, comprising the steps of:
    sensing an image for the portable device by using a camera unit;
    acquiring an orientation information estimation value of the portable device by using the sensed image;
    receiving orientation information of the portable device, the orientation information of the portable device being detected and sent by the portable device;
    extracting key generation information based on the orientation information estimation value and the orientation information;
    generating a secret key based on the extracted key generation information; and
    performing the secure communication by using the secret key.

2. The method of claim 1, wherein the orientation information estimation value includes angular information of the portable device for at least one of an x axis, a y axis, and a z axis.

3. The method of claim 2, wherein the orientation information estimation value includes the angular information detected at a preset time interval for a preset time.

4. The method of claim 1, wherein, in the step of extracting the key generation information, the orientation information estimation value is converted to a value of a preset quantization step.

5. The method of claim 1, further comprising the step of:
    calculating a compensation function by using the orientation information estimation value and the received orientation information,
    wherein the key generation information is extracted using the orientation information estimation value and the compensation function.

6. The method of claim 1, wherein the step of performing the secure communication comprises the steps of:
    encrypting data by the generated secret key; and
    transmitting the encrypted data to the portable device.

7. The method of claim 1, wherein the step of performing the secure communication comprises the steps of:
    receiving data from the portable device; and
    decrypting the received data by the secret key.

8. A stationary device performing secure communication with a portable device, comprising:
    a processor that controls an operation of the stationary device;
    a camera unit that is configured to sense an image of an object and transfer the sensed image to the processor; and
    a communication unit that is configured to transmit/receive data based on a command of the processor,
    wherein the processor is configured to cause the camera unit to sense an image for the portable device, acquire an orientation information estimation value of the portable device by using the sensed image, receive orientation information of the portable device being detected and sent by the portable device, extract key generation information based on the orientation information estimation value and the orientation information, generate a secret key by based on the extracted key generation information, and perform the secure communication with the portable device by using the secret key.

9. The stationary device of claim 8, wherein the orientation information estimation value includes angular information of the portable device for at least one of an x axis, a y axis, and a z axis.

10. The stationary device of claim 9, wherein the orientation information estimation value includes the angular information detected at a preset time interval for a preset time.

11. The stationary device of claim 8, wherein the processor is further configured to convert the orientation information estimation value to a value of a preset quantization step and extract the key generation information.

12. The stationary device of claim 8, wherein the processor is further configured to calculate a compensation function by using the orientation information estimation value and the received orientation information, and extract the key generation information by using the orientation information estimation value and the compensation function.

13. The stationary device of claim 8, wherein, in the secure communication, data is encrypted by the generated secret key and the encrypted data is transmitted to the portable device.

14. The stationary device of claim 8, wherein, in the secure communication, data is received from the portable device and the received data is decrypted by the secret key.

15. A method using a digital device, having a radiator of a proximity sensor and a receiver of the proximity sensor, for secure communication between the digital device and an external device, comprising the steps of:
    outputting a first light pattern to the external device by using the radiator of the proximity sensor;
    acquiring a second light pattern received through the receiver of the proximity sensor, the second light pattern being the first light pattern reflected by the external device;
    extracting key generation information by using based on the second light pattern;
    generating a secret key by using the key generation information; and
    performing the secure communication with the external device by using the generated secret key.

16. The method of claim 15, wherein, in the step of extracting the key generation information, when the second light pattern is equal to the first light pattern, the key generation information is extracted using the second light pattern.

17. The method of claim 15, wherein, in the step of outputting the first light pattern, when the second light pattern is not acquired for a preset time, output of the first light pattern is stopped.

18. The method of claim 15, further comprising a step of:
detecting orientation information of the digital device,
wherein, in the step of outputting the first light pattern, when orientation of the digital device is preset orientation, the first light pattern is output.

19. The method of claim 15, wherein the step of performing the secure communication comprises the steps of:
encrypting data by the secret key; and
transmitting the encrypted data to the external device.

20. The method of claim 15, wherein the step of performing the secure communication comprises the steps of:
receiving data from the external device; and
decrypting the received data by the secret key.

21. A digital device performing secure communication with an external device, comprising:
a processor that controls an operation of the digital device;
a proximity sensor that includes a radiator that is configured to output a light pattern and a receiver that is configured to receive a light pattern; and
a communication unit that is configured to transmit/receive data based on a command of the processor,
wherein the digital device is configured to cause the radiator to output a first light pattern to the external device by using the radiator of the proximity sensor, acquire through the receiver a second light pattern which is the first light pattern reflected by the external device, extract key generation information based on the second light pattern, generate a secret key by using the key generation information, and perform the secure communication with the external device by using the generated secret key.

22. The digital device of claim 21, wherein, when the second light pattern is equal to the first light pattern, the digital device extracts the key generation information by using the second light pattern.

23. The digital device of claim 21, wherein, when the second light pattern is not acquired for a preset time, the digital device stops output of the first light pattern.

24. The digital device of claim 21, further comprising:
a sensor unit that is configured to detect orientation information of the digital device and transfer the detected orientation information to the processor,
wherein, when detected orientation of the digital device is preset orientation, the digital device outputs the first light pattern.

25. The digital device of claim 21, wherein, in the secure communication, data is encrypted by the generated secret key and the encrypted data is transmitted to the external device.

26. The digital device of claim 21, wherein, in the secure communication, data is received from the external device and the received data is decrypted by the secret key.

* * * * *